(12) United States Patent
Valiquette et al.

(10) Patent No.: US 11,483,313 B2
(45) Date of Patent: Oct. 25, 2022

(54) TECHNOLOGIES FOR UPDATING AN ACCESS CONTROL LIST TABLE WITHOUT CAUSING DISRUPTION

(71) Applicant: Intel Corporation, Santa Clara, CA (US)

(72) Inventors: Real Valiquette, St-Bruno (CA); Carl Geoffrion, Saint-Jean-sur-Richelieu (CA); Andre Sylvain, Brossard (CA); Grzegorz Jereczek, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 16/021,816

(22) Filed: Jun. 28, 2018

(65) Prior Publication Data
US 2020/0007546 A1  Jan. 2, 2020

(51) Int. Cl.
*H04L 29/06* (2006.01)
*H04L 9/40* (2022.01)

(52) U.S. Cl.
CPC ................................ *H04L 63/101* (2013.01)

(58) Field of Classification Search
None
See application file for complete search history.

(56) References Cited

U.S. PATENT DOCUMENTS

| | | | | |
|---|---|---|---|---|
| 6,651,096 B1 * | 11/2003 | Gai | ...................... | H04L 63/0263 709/223 |
| 6,658,002 B1 * | 12/2003 | Ross | ....................... | H04L 45/50 370/392 |
| 7,024,515 B1 * | 4/2006 | Ruan | .................... | G06F 21/6218 370/236 |
| 7,133,914 B1 * | 11/2006 | Holbrook | ............ | H04L 41/0813 709/224 |
| 7,254,748 B1 * | 8/2007 | Wright | ................ | G06F 11/1064 711/108 |
| 7,349,382 B2 * | 3/2008 | Marimuthu | ........... | H04L 63/102 370/351 |
| 7,367,052 B1 * | 4/2008 | Desanti | ................... | H04L 63/06 726/3 |
| 7,933,282 B1 * | 4/2011 | Gupta | ............... | G06F 16/90339 370/412 |
| 8,107,370 B2 * | 1/2012 | Chandika | ................ | H04L 41/08 370/230.1 |
| 8,527,618 B1 * | 9/2013 | Wiese | ................... | G06F 21/575 709/223 |
| 8,639,625 B1 * | 1/2014 | Ginter | ..................... | G06F 21/10 705/50 |
| 8,750,144 B1 * | 6/2014 | Zhou | ....................... | H04L 45/54 370/252 |
| 8,990,492 B1 * | 3/2015 | Zhou | ....................... | H04L 45/54 711/108 |

(Continued)

*Primary Examiner* — Christopher C Harris
(74) *Attorney, Agent, or Firm* — Compass IP Law PC

(57) ABSTRACT

Technologies for updating an access control list (ACL) table while minimizing disruption includes a network device. The network device receives a request to store a rule in the ACL. The rule is associated with a precedence group. A precedence group is indicative of a placement priority of a given rule in the ACL. The network device determines, as a function of the precedence group, a placement for the requested rule in the ACL. The network device stores the rule according to the determined placement in the ACL.

25 Claims, 12 Drawing Sheets

(56) References Cited

U.S. PATENT DOCUMENTS

| | | | | |
|---|---|---|---|---|
| 9,305,115 | B1* | 4/2016 | Estan | G06F 1/3275 |
| 9,348,789 | B2* | 5/2016 | Wang | H04L 69/22 |
| 9,473,502 | B2* | 10/2016 | Basso | H04L 63/101 |
| 9,559,897 | B2* | 1/2017 | Lin | H04L 41/12 |
| 9,577,932 | B2* | 2/2017 | Ravipati | H04L 45/7457 |
| 9,674,193 | B1* | 6/2017 | Madasamy | H04L 63/10 |
| 9,912,639 | B1* | 3/2018 | Wighe | H04L 63/0263 |
| 10,097,378 | B2* | 10/2018 | Dong | H04L 12/6418 |
| 10,103,995 | B1* | 10/2018 | Baveja | H04L 47/20 |
| 10,115,463 | B1* | 10/2018 | Jiang | G06F 11/0727 |
| 10,397,116 | B1* | 8/2019 | Volpe | H04L 45/7457 |
| 10,491,521 | B2* | 11/2019 | Levy | H04L 45/7453 |
| 10,496,680 | B2* | 12/2019 | Levy | G06F 16/285 |
| 10,572,496 | B1* | 2/2020 | Frank | G06F 16/248 |
| 10,708,272 | B1* | 7/2020 | Holbrook | H04L 9/3242 |
| 10,778,721 | B1* | 9/2020 | Holbrook | G06F 16/9014 |
| 2003/0108043 | A1* | 6/2003 | Liao | H04L 45/54 370/392 |
| 2003/0226033 | A1* | 12/2003 | Zinda | G06F 21/52 726/22 |
| 2003/0231631 | A1* | 12/2003 | Pullela | H04L 47/10 370/392 |
| 2004/0127190 | A1* | 7/2004 | Hansson | H04L 63/101 455/403 |
| 2004/0128537 | A1* | 7/2004 | Zurko | G06F 21/6218 726/1 |
| 2005/0021752 | A1* | 1/2005 | Marimuthu | H04L 63/101 709/225 |
| 2005/0055573 | A1* | 3/2005 | Smith | H04L 45/54 726/4 |
| 2005/0076138 | A1* | 4/2005 | Sterne | H04L 45/7453 709/238 |
| 2005/0177544 | A1* | 8/2005 | Wigger | H04L 63/101 |
| 2005/0216770 | A1* | 9/2005 | Rowett | H04L 63/145 726/5 |
| 2005/0220094 | A1* | 10/2005 | Parker | H04L 63/101 370/389 |
| 2006/0080498 | A1* | 4/2006 | Shoham | G11C 15/00 711/108 |
| 2006/0106750 | A1* | 5/2006 | Smith | H04L 69/22 |
| 2006/0117058 | A1* | 6/2006 | Smith | H04L 63/105 |
| 2006/0130152 | A1* | 6/2006 | Katoh | H04L 63/101 726/29 |
| 2006/0156018 | A1* | 7/2006 | Lauer | H04L 63/101 713/182 |
| 2007/0283144 | A1* | 12/2007 | Kramer | H04L 63/101 713/164 |
| 2009/0199266 | A1* | 8/2009 | Kling | H04L 63/0263 726/1 |
| 2009/0271570 | A1* | 10/2009 | Burns | G06F 11/1064 711/108 |
| 2009/0300759 | A1* | 12/2009 | Wang | H04L 63/1458 726/22 |
| 2010/0061242 | A1* | 3/2010 | Sindhu | H04L 49/30 370/235 |
| 2010/0217936 | A1* | 8/2010 | Carmichael | C07D 413/10 711/118 |
| 2010/0223658 | A1* | 9/2010 | Narasimhan | H04L 63/101 726/4 |
| 2012/0110632 | A1* | 5/2012 | Burghart | H04W 4/00 726/1 |
| 2012/0117431 | A1* | 5/2012 | Bremler-Barr | G06F 11/1064 714/718 |
| 2013/0036102 | A1* | 2/2013 | Goyal | G06F 12/0802 707/694 |
| 2013/0239193 | A1* | 9/2013 | Bouchard | H04L 63/08 726/7 |
| 2013/0268729 | A1* | 10/2013 | Manhas | H04L 63/0263 711/108 |
| 2013/0301641 | A1* | 11/2013 | Anand | H04L 63/0263 370/389 |
| 2013/0346628 | A1* | 12/2013 | Canion | H04L 63/101 709/245 |
| 2014/0032591 | A1* | 1/2014 | Li | G06F 16/284 707/769 |
| 2014/0074539 | A1* | 3/2014 | Doering | H04L 41/5054 705/7.25 |
| 2014/0082176 | A1* | 3/2014 | Basso | H04L 45/7457 709/224 |
| 2014/0082195 | A1* | 3/2014 | Basso | H04L 12/00 709/225 |
| 2014/0244840 | A1* | 8/2014 | Sweeney | H04L 45/745 709/225 |
| 2014/0269290 | A1* | 9/2014 | Cors | H04L 63/101 370/232 |
| 2014/0282586 | A1* | 9/2014 | Shear | G06F 16/285 718/104 |
| 2015/0067815 | A1* | 3/2015 | Overcash | G06F 1/32 726/11 |
| 2015/0106677 | A1* | 4/2015 | Greenfield | G06F 21/64 714/767 |
| 2015/0200949 | A1* | 7/2015 | Willhite | H04L 63/101 726/13 |
| 2015/0310188 | A1* | 10/2015 | Ford | H04L 63/0428 726/28 |
| 2015/0341269 | A1* | 11/2015 | Basso | H04L 12/4625 370/392 |
| 2015/0341364 | A1* | 11/2015 | Basso | H04L 12/54 711/108 |
| 2015/0341365 | A1* | 11/2015 | Basso | H04L 29/06 711/108 |
| 2016/0034305 | A1* | 2/2016 | Shear | G06F 16/248 707/722 |
| 2016/0072833 | A1* | 3/2016 | Kim | H04L 63/101 726/23 |
| 2016/0080341 | A1* | 3/2016 | Jain | H04L 63/08 726/7 |
| 2016/0142358 | A1* | 5/2016 | Zunger | G06Q 50/01 709/206 |
| 2016/0191530 | A1* | 6/2016 | Jain | H04L 63/20 726/4 |
| 2016/0226830 | A1* | 8/2016 | Steeves | H04L 9/0894 |
| 2016/0262020 | A1* | 9/2016 | Zalzalah | H04W 12/0802 |
| 2016/0330117 | A1* | 11/2016 | Thirumurthi | H04L 69/22 |
| 2016/0337378 | A1* | 11/2016 | Wan | G06Q 20/12 |
| 2016/0359641 | A1* | 12/2016 | Bhat | H04L 63/101 |
| 2017/0214719 | A1* | 7/2017 | Mohan | H04L 63/101 |
| 2017/0244645 | A1* | 8/2017 | Edsall | H04L 63/08 |
| 2017/0346790 | A1* | 11/2017 | Duda | H04L 63/0263 |
| 2017/0357960 | A1* | 12/2017 | Quentin | G06Q 20/40145 |
| 2018/0006921 | A1* | 1/2018 | Mozes | H04L 63/0254 |
| 2018/0145983 | A1* | 5/2018 | Bestler | H04L 9/3236 |
| 2018/0157728 | A1* | 6/2018 | O'Brien | G06F 11/1461 |
| 2018/0176128 | A1* | 6/2018 | Sharma | H04L 41/0886 |
| 2018/0287907 | A1* | 10/2018 | Kulshreshtha | H04L 43/04 |
| 2018/0351791 | A1* | 12/2018 | Nagarajan | H04L 41/08 |
| 2018/0351957 | A1* | 12/2018 | Mott | H04L 63/20 |
| 2018/0365095 | A1* | 12/2018 | Monk | H04L 43/0823 |
| 2018/0365121 | A1* | 12/2018 | Harneja | G06F 11/2289 |
| 2018/0367393 | A1* | 12/2018 | Harneja | H04L 41/0873 |
| 2018/0367394 | A1* | 12/2018 | Harneja | H04L 41/12 |
| 2018/0367395 | A1* | 12/2018 | Harneja | H04L 41/0866 |
| 2018/0367396 | A1* | 12/2018 | Kompella | H04L 41/0853 |
| 2018/0367404 | A1* | 12/2018 | Harneja | G06F 11/006 |
| 2018/0367541 | A1* | 12/2018 | Ponnuswamy | H04L 63/20 |
| 2019/0020666 | A1* | 1/2019 | Leung | H04L 63/0227 |
| 2019/0056934 | A1* | 2/2019 | Rathi | G06F 9/467 |
| 2019/0104040 | A1* | 4/2019 | Sharma | H04L 41/0806 |
| 2019/0104065 | A1* | 4/2019 | Sharma | H04L 63/101 |
| 2019/0130124 | A1* | 5/2019 | Dasgupta | H04L 63/105 |
| 2019/0158505 | A1* | 5/2019 | An | H04L 45/745 |
| 2019/0190792 | A1* | 6/2019 | Chen | H04L 41/147 |
| 2019/0260770 | A1* | 8/2019 | Sansom | H04L 63/1433 |
| 2019/0280927 | A1* | 9/2019 | Filsfils | H04L 41/0826 |
| 2019/0297114 | A1* | 9/2019 | Panchalingam | H04L 41/0893 |
| 2019/0349307 | A1* | 11/2019 | Wu | H04L 45/745 |
| 2019/0370115 | A1* | 12/2019 | Garvey | G06K 9/6222 |

(56) References Cited

U.S. PATENT DOCUMENTS

2019/0372895 A1* 12/2019 Parthasarathy ....... H04L 49/205
2019/0379635 A1* 12/2019 Sundararajan ...... H04L 61/1511
2020/0177456 A1*  6/2020 Kompella ........... H04L 41/0686

* cited by examiner

TECHNOLOGIES FOR UPDATING AN ACCESS CONTROL LIST TABLE WITHOUT CAUSING DISRUPTION

BACKGROUND

In computer networks, a network device (e.g., a network switch, router, etc.) may include an access control list (ACL). Generally, an ACL refers to a strictly ordered list of rules applied to a device. The network device may process network traffic according to rules provided in the ACL. For example, an ACL may include rules that specify certain network hosts or addresses to which the network device should permit or deny access. A network device may implement an ACL in a table provided by a ternary content addressable memory (TCAM). Properties of the TCAM, such as a two-bit encode for search comparisons allows for high-speed searching through the ACL.

Typically, a network device inserts a given ACL rule into a TCAM table based on priority of the rule. For instance, a numeric identifier associated with a rule may be indicative of a priority of the rule. Rules are also packed to be adjacent one another, such that, e.g., a rule of priority 1 is stored in an entry having a row index that is immediately adjacent to an entry storing a rule of priority 5. Consequently, if a rule having a priority between the priority of other rules is to be added to the ACL table in the TCAM, the rules on the ACL would need to be moved to provide an available entry for the new rule. This is particularly inefficient in cases where many rules already stored in the ACL need to be moved to another entry to accommodate the new rule. Further, applications must be aware of the hardware used to implement the ACL (e.g., the TCAM) and keep track of all entries being used at any time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
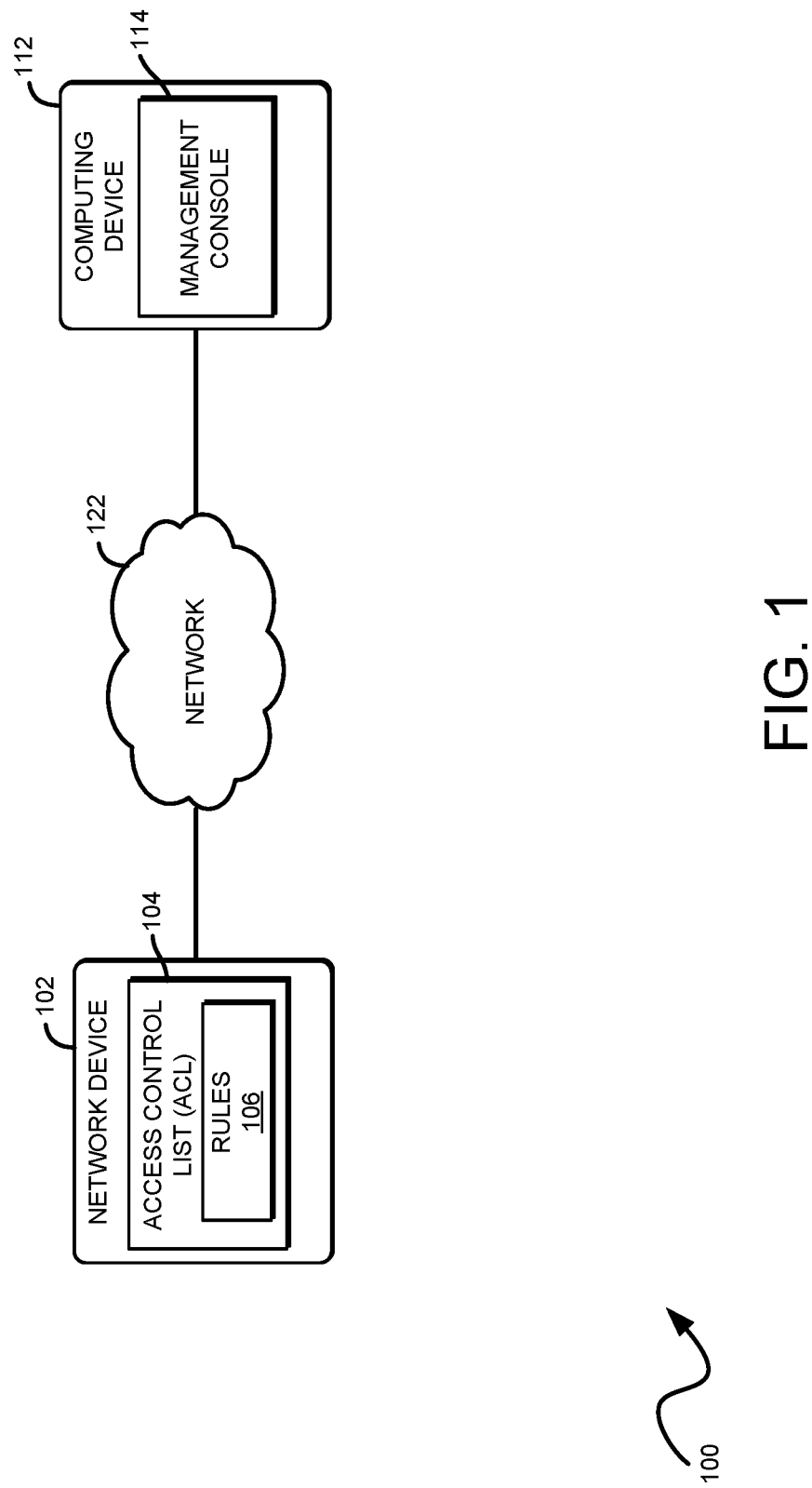
FIG. 1 is a simplified block diagram of at least one embodiment of a computing environment to update an access control list (ACL) table on a network device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an example computing environment 100 for updating an access control list (ACL) table without causing disruption to network traffic is shown. Illustratively, the computing environment 100 includes a network device 102 and a computing device 112, each connected to a network 122. The computing environment 100 may be representative of a portion of a larger computer network, data center, enterprise network, switch fabric, and the like.

In some embodiments, the network device 102 is representative of a device that interconnects devices in a computer network, such as a network switch or a router. Further, in some embodiments, the network device 102 is embodied as a physical network device. In other embodiments, the network device 102 is embodied as a virtual computing instance, such as a virtual switch executing atop physical computing resources. For instance, the network device 102 may process incoming network data (e.g., packets, frames, and the like) from other computing devices that are directed to a given destination. For example, assume that computing environment 100 is representative of a data center having multiple physical systems executing virtual machine instances. The virtual machine instances may execute workloads that need to send and receive data to/from other virtual machine instances or other devices. The network device 102 includes an access control list (ACL) 104. The ACL 104 may be a structure that provides an ordered list of rules 106 that direct the network device 102 on how to process a given packet. For example, the rule 106 may specify certain hosts or addresses to which the network device 102 should permit or deny access. A rule 106 may also specify forwarding instructions for a network data. Further, the network device 102 evaluates how traffic should be processed based on a priority associated with the rule. For instance, a rule relating to a packet originating from a given source that has priority over another rule relating to the same packet will generally override the other rule.

Rules 106 may be added to the ACL 104 at any given time, such as prior to activation of the network device 102 or while the network device 102 is currently online. For example, the computing device 112 may, via the network 122, remotely configure the network device 102, such as by sending rules to be inserted to the ACL 104. The computing device 112 may be representative of a physical computing device (e.g., a desktop computer, laptop computer, tablet computer, smartphone device, etc.) or a virtual computing instance executing in the cloud. As shown, the computing device 112 includes a management console 114. The management console 114 may provide an interface that allows for specified ACL rules to be sent to the network device 102. Although the computing device 112 is depicted as remotely connected with the network device 102, other configurations may be contemplated, such as a local connection with the network device 102.

As further described herein, embodiments provide techniques for updating the ACL 104 while minimizing disruption to performance In an embodiment, the techniques allow the network device 102 to dynamically update the hardware, such as the TCAM, in which ACL rules are added to the TCAM without specifying a location (e.g., a row index), thus reducing software complexity and performance overhead during insertion of an ACL rule. The techniques also allow the network device 102 to add rules of any precedence without reserving an index for each rule, thus providing flexibility of use of the TCAM. More particularly, a precedence group is assigned to each rule to be added to the ACL 104. A precedence group is indicative of a priority that one or more rules has over a given rule that is assigned to another precedence group. For example, a precedence group may correspond to a numeric value in which a lesser value is associated with a lower priority.

Figure 2:
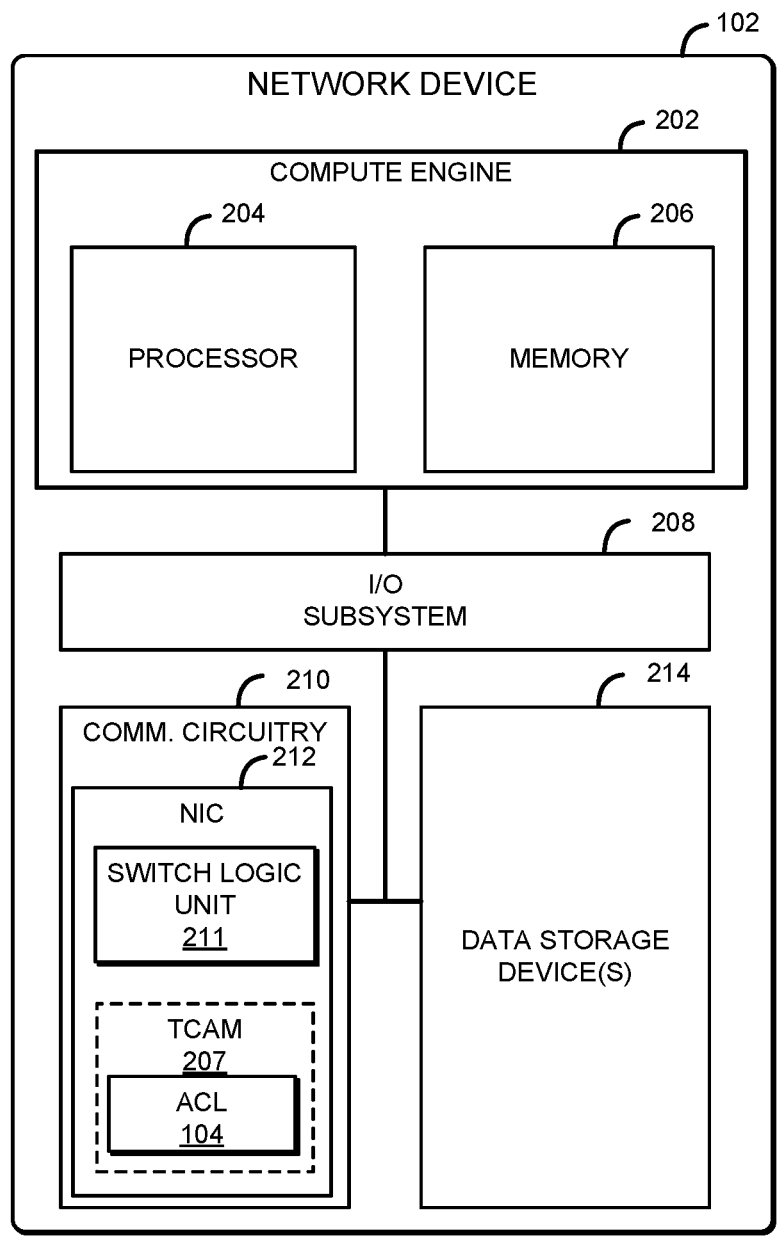
FIG. 2 is a simplified block diagram of at least one embodiment of a network device of the computing environment of FIG. 1.

Referring now to FIG. 2, a network device 102 may be embodied as any type of device capable of performing the functions described herein, including receiving a request to store a rule to the ACL 104, in which the rule is associated with a given precedence group that is indicative of a placement priority of the rule in the ACL 104, determine a placement for the rule in the ACL 104 as a function of the precedence group, and store the rule according to the determined placement in the ACL 104.

As shown, the illustrative network device 102 includes a compute engine 202, an input/output (I/O) subsystem 208, communication circuitry 210, and one or more data storage devices 214. Of course, in other embodiments, the network device 102 may include other or additional components, such as those commonly found in a computer (e.g., display, peripheral devices, etc.), such as peripheral devices. Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 206. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2

SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204.

The compute engine 202 is communicatively coupled with other components of the computing environment 100 via the I/O subsystem 208, which may be embodied as circuitry and/or components to facilitate input/output operations with the compute engine 202 (e.g., with the processor 204 and/or the memory 206) and other components of the network device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the network device 102, into the compute engine 202.

The communication circuitry 210 may be embodied as any communication circuit, device, or collection thereof, capable of enabling communications over a network between the network device 102 and other devices, such as the compute device 112. The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 212, which may also be referred to as a host fabric interface (HFI). The NIC 212 includes an Ethernet port logic to connect to remote devices (e.g., other network devices, devices connected to the network 122, and the like). The NIC 212 may be embodied as one or more add-in-boards, daughtercards, controller chips, chipsets, or other devices that may be used by the computing device 200 for network communications with remote devices. For example, the NIC 212 may be embodied as an expansion card coupled to the I/O subsystem 208 over an expansion bus such as PCI Express. Illustratively, the NIC 212 includes a switch logic unit 211, which may be embodied as any hardware, software, circuitry, and the like to provide network switch capability and the ACL management techniques described herein. Further, the NIC 212 includes a ternary content addressable memory (TCAM) 207. Generally, a TCAM (e.g., TCAM 207) is a type of content addressable memory (CAM) that provides high-speed searching of data stored therein. Data stored in the TCAM 207 is accessed by providing a search key (rather than a memory address). Each position in the TCAM is formed with a two-bit encode that provides four combinations: Match 0, Match 1, Always Match (e.g., a "wildcard" or "don't care" bit), and Never Match. During a search operation, the TCAM 207 performs a comparison of the search key against the values stored in each row. The TCAM 207 does so to obtain one or more locations containing matching data. In the illustrative embodiment, the TCAM 207 includes the ACL 104. The ACL 104 provides one or more rule conditions and rule actions in a table that provides a structure that is numerically indexed for each row. Note, although a TCAM 207 is depicted herein, other types of memory may be used to store the ACL 104, such as a CAM. Further note that although the ACL 104 is depicted as being handled within the NIC 212, other components of the network device 102 may also be configured to maintain the ACL 104 carry out operations thereon.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

Additionally or alternatively, the network device 102 may include one or more peripheral devices. Such peripheral devices may include any type of peripheral device commonly found in a compute device such as a display, speakers, a mouse, a keyboard, and/or other input/output devices, interface devices, and/or other peripheral devices.

As described above, the network device 102 and the computing device 112 are illustratively in communication via the network 122, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
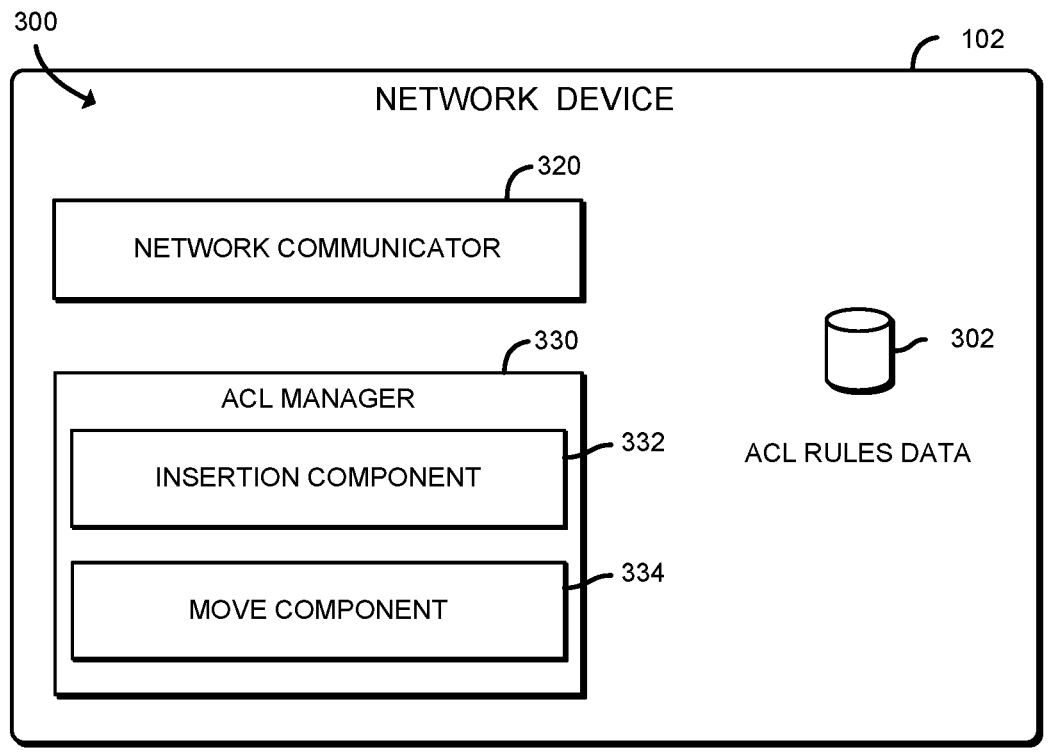
FIG. 3 is a simplified block diagram of at least one embodiment of an environment that may be established by the network device of FIG. 2.

Referring now to FIG. 3, the network device 102 may establish an environment 300 during operation. The illustrative environment 300 includes a network communicator 320 and an ACL manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, ACL manager circuitry 330, etc.). It should be appreciated that, in such embodiments, one or more of the network communicator circuitry 320 or ACL manager circuitry 330 may form a portion of one or more of the NIC 212, compute engine 202, the communication circuitry 210, the I/O subsystem 208 and/or other components of the network device 102. In the illustrative embodiment, the environment 300 includes ACL rules data 302, which may be embodied as any data indicative of one or more rules added to the ACL 104. Each rule of the ACL rules data 302 may include, without limitation, an identifier, a rule condition, rule action, and a value representative of a precedence group. The precedence group is indicative of a priority of a given rule in the ACL 104. Further, the precedence group may be predetermined, e.g., during creation of the rule.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 102, respectively. To do so, the network communicator 320 is configured to receive and process data packets from one system or computing device and to prepare and send data packets to a computing device or system. Accordingly, in some embodiments, at least a portion of the functionality of the network communicator 320 may be performed by the communication circuitry 210, and, in the illustrative embodiment, by the NIC 212.

The ACL manager 330, which may be embodied as hardware, firmware, software, virtualized hardware, emulated architecture, and/or a combination thereof, is to manage the insertion of an ACL rule to the ACL 104. For instance, the ACL manager 330 is to receive a request to store an ACL rule to the ACL 104. The ACL rule is associated with a precedence group indicative of a placement of the rule in the ACL 104. The ACL manager 330 is also to determine, as a function of the precedence group, a placement for the rule in the ACL 104. Once determined, the ACL manager 330 is to store the rule in the ACL 104 according to the determined placement. To do so, the ACL manager 330 includes an insertion component 332 and a move component 334.

The insertion component 332, in the illustrative embodiment, is configured to receive a request to add a rule to the ACL 104. The request may include the rule, in which the rule includes an identifier, rule condition, rule action, and other information associated with the rule to be inserted. Further, the rule includes a value indicative of the precedence group determining the placement of the rule in the ACL 104. The insertion component 332 determines a placement of the rule in the ACL 104. In determining the placement, the insertion component 332 evaluates the placement of rules already placed in the ACL 104 (if any). For instance, the insertion component 332 may compare the precedence group value associated with the rule to be inserted with the precedence group value associated with rules already inserted. Generally, the insertion component 332 adds the rule in an entry of the ACL 104 that is located substantially in the middle of rule entries associated with low and high offset precedence group values. In the case of an empty ACL 104, the insertion component 332 adds the rule in the entry that is located in a row index that is substantially in the middle of the ACL 104 (e.g., where the row index is equal to the total number of entries available divided by two). An exception to the aforementioned insertion may occur in cases where the precedence group value is 0, which indicates that the rule is always added to the beginning of the table. A precedence group value of 0 may also be indicative of a lowest precedence in the ACL 104.

Further, the insertion component 332 groups rules that share the same precedence group value. In particular, the insertion component 332 may add a given rule in an entry located adjacent (e.g., in a row index that is immediately below) to a rule that has an identical precedence group value. A rule that is associated with an identical precedence group value as another rule has the same priority over other rules of lower priority. Consequently, the network device 102, in evaluating the ACL 104, may execute rules of an identical precedence group in any order.

The move component 334, in the illustrative embodiment, is configured to move a rule (or multiple rules) stored in the ACL 104 in instances where the insertion component 332 is to make an entry available for a rule to be inserted. Examples of instances in which the move component 334 operates include where rules of two precedence group values are stored immediately adjacent to one another (e.g., a group of rules of a precedence group value of 4 and a group of rules of a precedence group value of 6) and a rule having a precedence group value that is intermediary to the other precedence group values (e.g., continuing the previous example, a rule of a precedence group value of 5). The move component 334 may rearrange the position of a given rule (or group of rules) to create an available entry for the rule to be inserted. For example, the move component 334 may reposition a rule of a precedence group from the last row index of the group to the immediately available row index above the first rule of that group. As another example, the move component 334 may reposition a rule of a precedence group from the first row index of the group to the immediately available row index below the last rule of that group. As another example, the move component 334 may reposition one or more group of rules to other positions in the table by one or more increments to create an available entry for the rule.

It should be appreciated that each of the insertion component 332 and the move component 334 may be separately embodied as hardware, firmware, software, virtualized hardware, emulated architecture, and/or a combination thereof. For example, the insertion component 332 may be embodied as hardware components, while the move component 334 is embodied as virtualized hardware components or as some other combination of hardware, firmware, software, virtualized hardware, emulated architecture, and/or a combination thereof.

Figure 4:
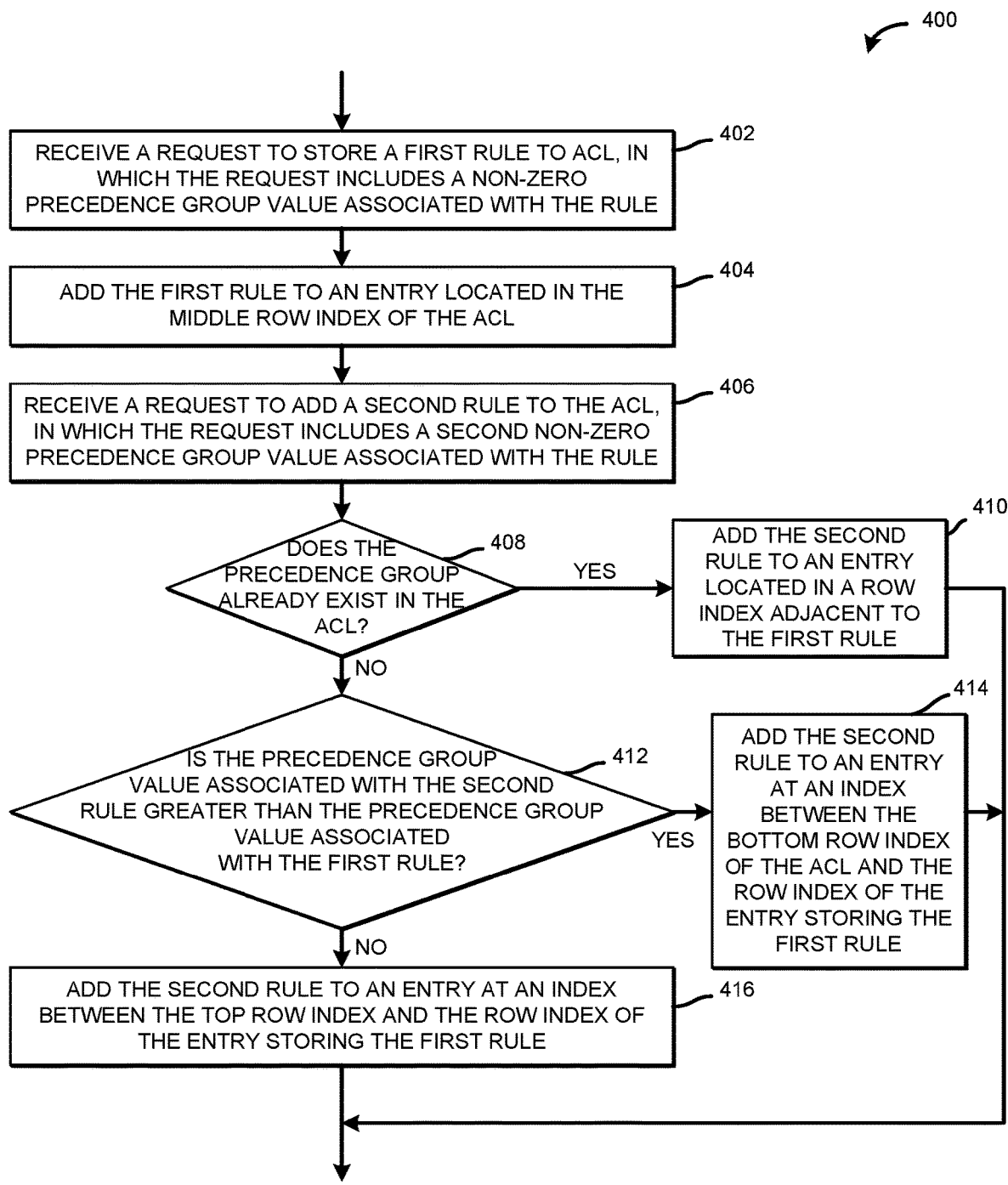
FIG. 4 is a simplified flow diagram of a method for inserting a rule to an empty ACL table on the network device of FIG. 2.

Referring now to FIG. 4, the network device 102, in operation, performs a method 400 for inserting rules to an empty table in the TCAM representative of the ACL 104. More specifically, the method 400 provides an example of how a rule is generally added to the ACL 104, contrasting from traditional techniques of adding a rule at the first available indexed entry. As shown, the method 400 begins in block 402, where the network device 102 receives a request to store a rule to the ACL. In this example, the request includes a non-zero precedence group value that is associated with the rule. In block 404, the network device 102 adds the rule to an entry located in a middle row index of the ACL 104. For example, in a table that starts from a row index of 0, the middle row index may correspond to a (maximum number of entries—1) divided by two.

In block 406, the network device 102 receives a request to add another rule to the ACL 104. In this example, this request includes a precedence group value that is non-zero. In block 408, the network device 102 determines whether the precedence group already exists in the ACL 104. More particularly, the network device 102 determines whether a rule that is associated with precedence group value of the rule to be inserted is present.

If so, then in block 410, the network device 102 adds the new rule to an entry located in a row index adjacent to the previously inserted rule. For instance, the network device 102 may insert the rule in an entry having a row index immediately following the entry storing the previous rule. Otherwise, if the precedence group value does not already exist in the ACL 104, then in block 412, the network device 102 determines whether the precedence group value associated with the new rule is greater than the precedence group value associated with the previous rule. If so, and as indicated in block 414, the network device 102 adds the new rule to an entry located at in index between the bottom row index of the ACL 104 (e.g., an index equal to the maximum number of entries—1 for an example implementation of the ACL 104) and the row index of the entry storing the previous rule. Otherwise, in block 416, the network device 102 adds the second rule to an entry at a row index between the top row index (e.g., the first index of the ACL 104 table) and the row index of the entry storing the previously added rule.

Figure 5:
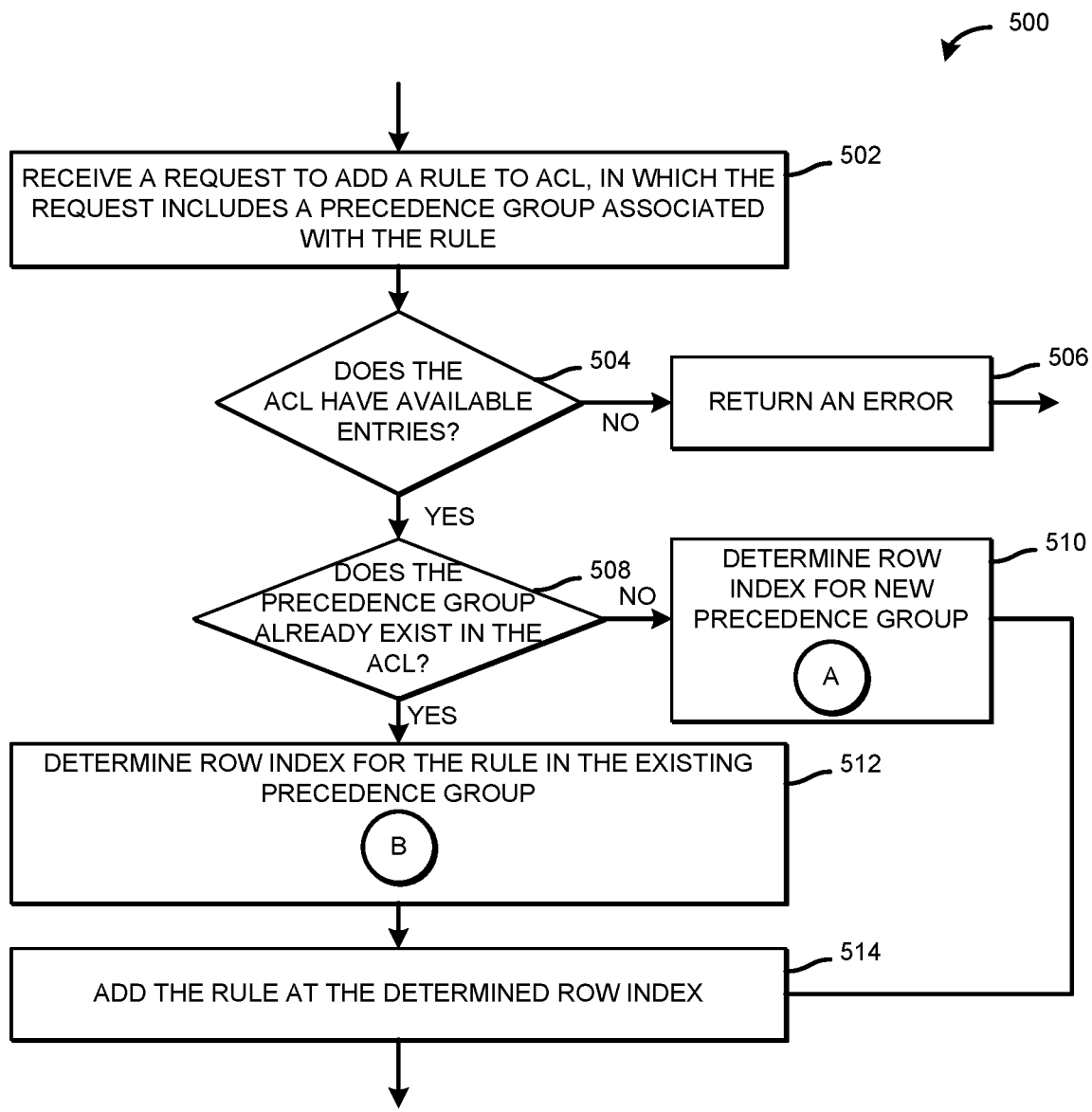
FIG. 5 is a simplified flow diagram of a method for updating an ACL table on the network device of FIG. 2.

Referring now to FIG. 5, the network device 102, in operation, may perform a method 500 for updating the ACL 104. As shown, the method 500 begins in block 502, where the network device 102 receives a request to add a rule to the ACL. For example, the network device 102 may receive the rule from a user (e.g., from the management console 114). The request may specify the rule, which may include a precedence group value associated with the rule. In block 504, the network device 102 determines whether the ACL 104 has available entries. If not, then the ACL 104 may be full. In such a case, in block 506, the network device 102 returns an error. Otherwise, if the ACL 104 has available entries, then in block 508, the network device 102 determines whether rules having an identical precedence group value to the new rule already exists in the ACL 104.

If not, then in block 510, the network device 102 determines a location (e.g., an entry at a particular row index) in which to add the new rule as part of a new precedence group. The determination is described further relative to FIG. 6. Once determined, in block 514, the network device 102 adds the rule at the location, e.g., the determined row index. If the precedence group already exists in the ACL 104, then the network device 102 adds the new rule to a location with the other rules of the identical precedence group value. More particularly, in block 512, the network device 102 determines a location (e.g., an entry at a particular row index) in which to add the new rule as part of the existing precedence group. Once determined, in block 514, the network device 102 adds the rule at the location, e.g., the determined row index.

Figure 6:
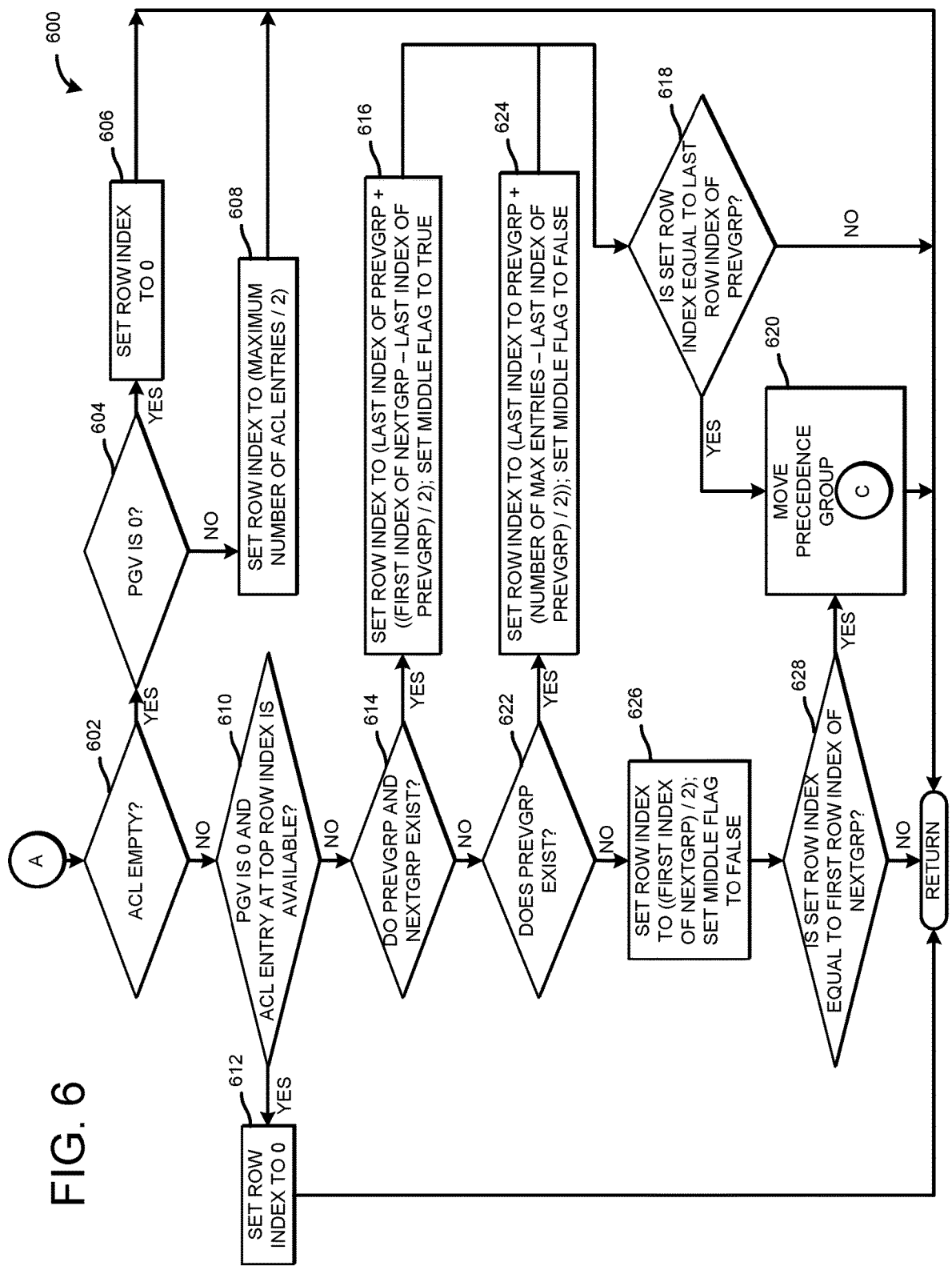
FIG. 6 is a simplified flow diagram of a method for determining a row index for a new precedence group associated with a rule to be inserted in the ACL table on the network device of FIG. 2.

Referring now to FIG. 6, the network device 102, in operation, may perform a method 600 for determining a row index for the new rule in cases where the rule is associated with a precedence group that is not currently present in the ACL 104. As shown, the method 600 begins in block 602, where the network device 102 determines whether the ACL 104 is currently empty. If so, in block 604, the network device 102 determines whether the precedence group value (PGV) associated with the rule is 0. As noted, rules having a precedence group of zero are generally stored in an entry towards the beginning of the list. In the case that the ACL 104 is empty, the network device 102 sets the row index for insertion to 0, as indicated in block 606. Otherwise, and as indicated in block 608, the network device 102 sets the row index to the middle of the ACL 104, e.g., the maximum number of entries in the ACL 104 divided by 2.

If the ACL 104 is not empty, then in block 610, the network device 102 determines whether the precedence group value is 0 and also determines whether the row index in the beginning of the ACL 104 is available. If so, then in block 612, the network device 102 sets the row index to 0. If not, then the network device 102 determines whether the precedence group value associated with the new rule is between two precedence group values that already exist in the ACL 104. More specifically, in block 614, the network device 102 determines whether a previous precedence group (PREVGRP) and a next precedence group (NEXTGRP) relative to the precedence group of the rule to be inserted exists in the ACL 104.

If so, then in block 616, the network device 102 sets the row index of the rule to be inserted substantially in between the last index of the previous precedence group and the first index of the next precedence group, e.g., (the first index value of the next precedence group—the last index value of the previous precedence group) divided by 2. The network device 102 also sets a middle flag to true. In some embodiments, a middle flag is used as an argument to indicate (e.g., when set to true) whether the new precedence group is inserted between two existing precedence groups. In block 618, the network device 102 determines whether the determined row index is equal to the last row index of the previous precedence group. The set row index being equal to the last row index of the previous group indicates that the rules of at least either the previous precedence group or the next precedence group should be moved to create availability for the new rule in the ACL 104. In block 620, the network device 102 moves the precedence groups. Precedence group movement is further described relative to FIG. 8.

Returning to block 614, if one of either the previous precedence group or the next precedence group do not exist, then in block 622, the network device 102 determines whether a rule associated with a previous precedence group exists in the ACL 104. If so, then the network device 102 sets the row index to a location between the previous precedence group and the end of the ACL 104. For instance, in block 624, the network device 102 sets the row index to the (last index to the previous precedence group+(the number of maximum entries–the last index of the previous group)/2)). The network device 102 also sets the middle flag to false. The method 600 then proceeds to block 618, in which the network device 102 determines whether the row index is equal to the last row index of the previous precedence group. If so, then in block 620, the network device 102 moves precedence groups to create availability for the new rule at that set index.

Returning to block 622, if the previous precedence group value does not exist, then a rule associated with a precedence group value greater than that of the rule to be inserted is on the ACL 104. In such a case, in block 626, the network device 102 sets the row index to a location between the beginning of the ACL 104 and the next precedence group, e.g., (the first index of the next precedence group/2). The network device 102 also sets the middle flag to false. In block 628, the network device 102 determines whether the set row index is equal to the first row index of the rule stored as part of the next precedence group. If so, then in block 620, the network device 102 moves the precedence group to create availability for the new rule. At the end of method 600, the network device 102 returns to method 500.

Figure 7:
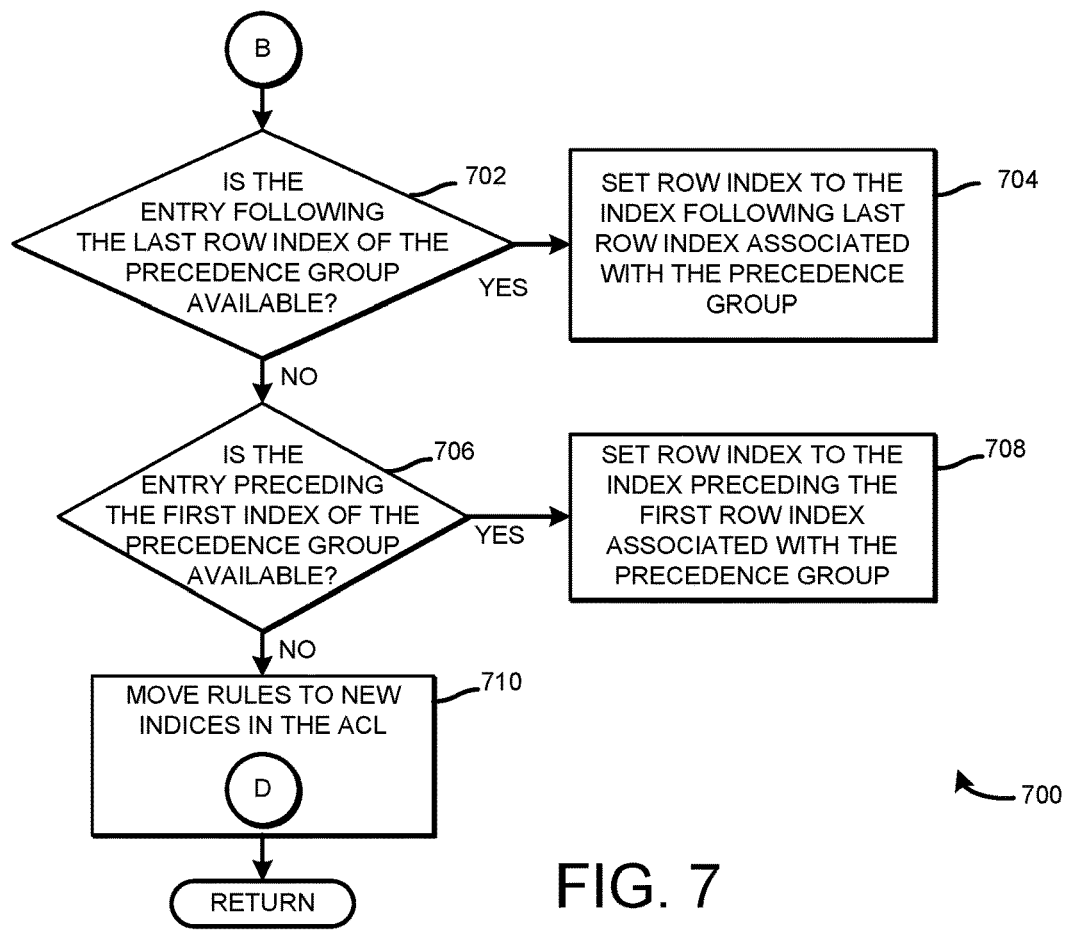
FIG. 7 is a simplified flow diagram of a method for determining a row index for a rule associated with a precedence group that already exists in the ACL table on the network device of FIG. 2.

Referring now to FIG. 7, the network device 102, in operation, performs a method 700 for determining a location in the ACL 104 in which to store a new rule, in which the rule is associated with a precedence group already present in the ACL 104. As shown, the method 700 begins in block 702, in which the network device determines whether an entry following the last row index associated with the precedence group value is available. If so, in block 704, the network device 102 sets the row index to the index following the last row index associated with the precedence group.

Otherwise, if the entry following the last row index of the precedence group is not available, then in block 706, the network device 102 determines whether the entry preceding the first index of the precedence group is available. If so, then in block 708, the network device 102 sets the row index to an index preceding the first row index associated with the precedence group. However, if not, then rules of other precedence groups are likely immediately adjacent to the precedence group at both ends of the indices associated with the precedence group. In such a case, in block 710, the network device 102 moves the rules to new indices in the ACL 104. Doing so allows the network device 102 to create an available entry in the ACL 104 for the new rule. The rule movement is further described relative to FIG. 11.

Figure 8:
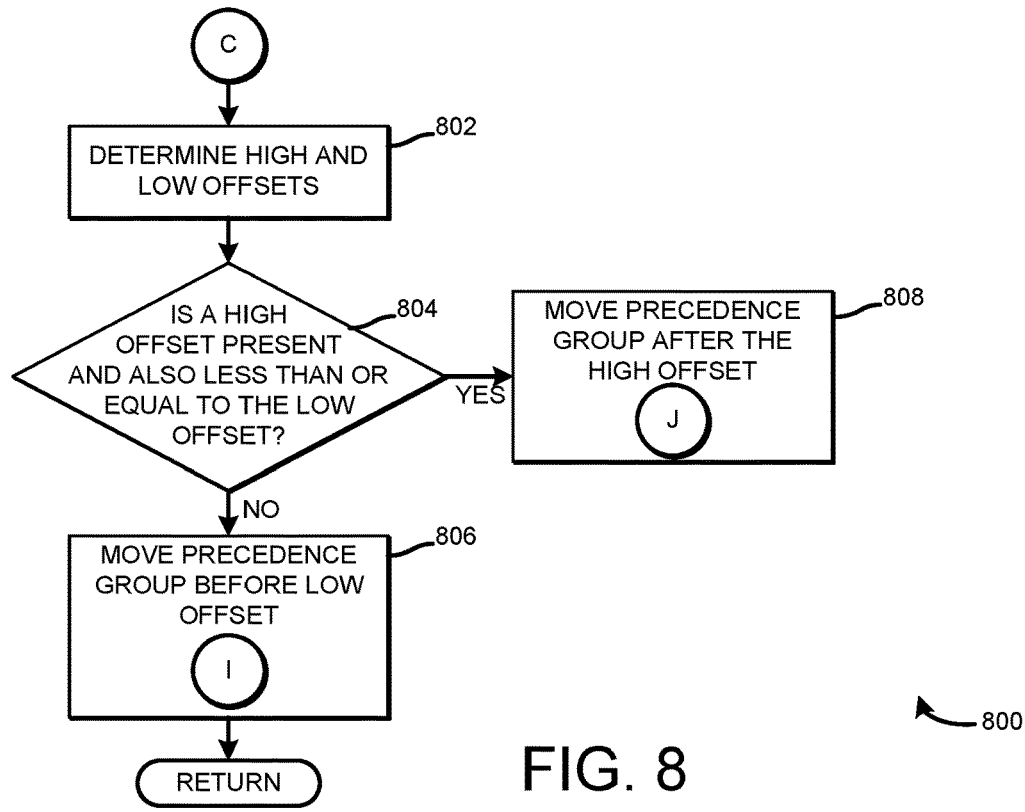
FIG. 8 is a simplified flow diagram of a method for moving a precedence group in the ACL table on the network device of FIG. 2.

Referring now to FIG. 8, the network device 102, in operation, performs a method 800 for moving precedence groups to create an available entry for the new rule. As shown, the method 800 begins in block 802, in which the network device 102 determines high and low offsets. The low offset corresponds to the offset between the set row index and the first available entry down in the table. The high offset corresponds to the offset between the set row index and the first available entry up in the table.

Once determined, in block 804, the network device 102 determines whether a high offset value is present and if so, whether the high offset value is less than or equal to the low offset. If not, then in block 806, the network device 102 moves the precedence group before the low offset. This approach is further described relative to FIG. 9. Otherwise, if so, then in block 808, the network device 102 moves the precedence group associated with the new rule after the determined offset values. This approach is further described relative to FIG. 10.

Figure 9:
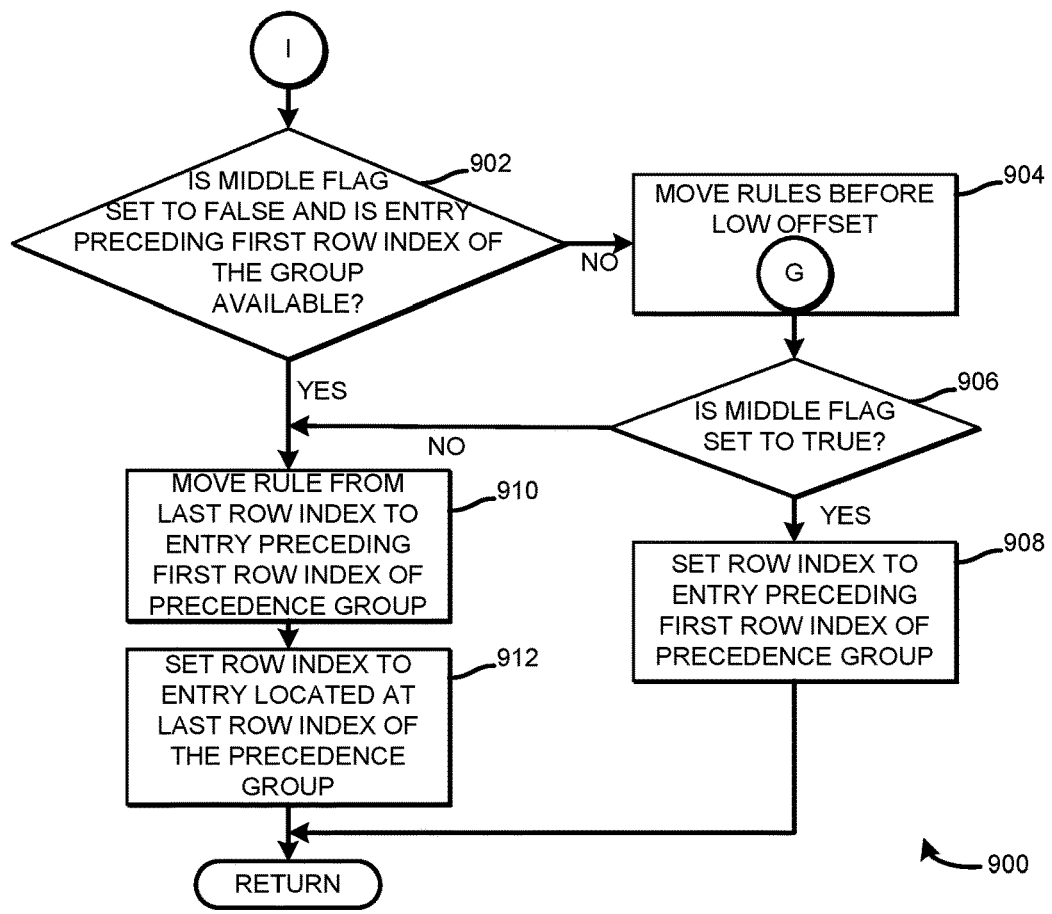
FIG. 9 is a simplified flow diagram of a method for moving a precedence group before determined offsets in the ACL table on the network device of FIG. 2.

Referring now to FIG. 9, the network device 102, in operation, performs a method 900 for moving a group of rules associated with a given precedence value. As shown, the method begins in block 902, in which the network device 102 determines whether the middle flag is set to false and whether the entry preceding the first row index of the precedence group is available. If not, then in block 904, the network device 102 moves the rules in positions preceding the low offset value. This approach is further described relative to FIG. 12. In block 906, the network device 102 determines whether the middle flag is set to true (e.g., for an instance where a previous precedence group and a next precedence group exists relative to the precedence group associated with the new rule). If so, and as indicated in block 908, the network device 102 sets the row index to the entry preceding the first row index of the precedence group. If not, the method 900 proceeds to block 910.

Returning to block 902, if the middle flag is set to false and if the entry preceding the first row index of the prece-dence group is available, then in block 910, the network device 102 moves the rule at the last row index of the precedence group to the entry preceding the first row index of the precedence group. In block 912, the network device 102 sets the row index of the new rule to the entry located at the last row index of the precedence group.

Figure 10:
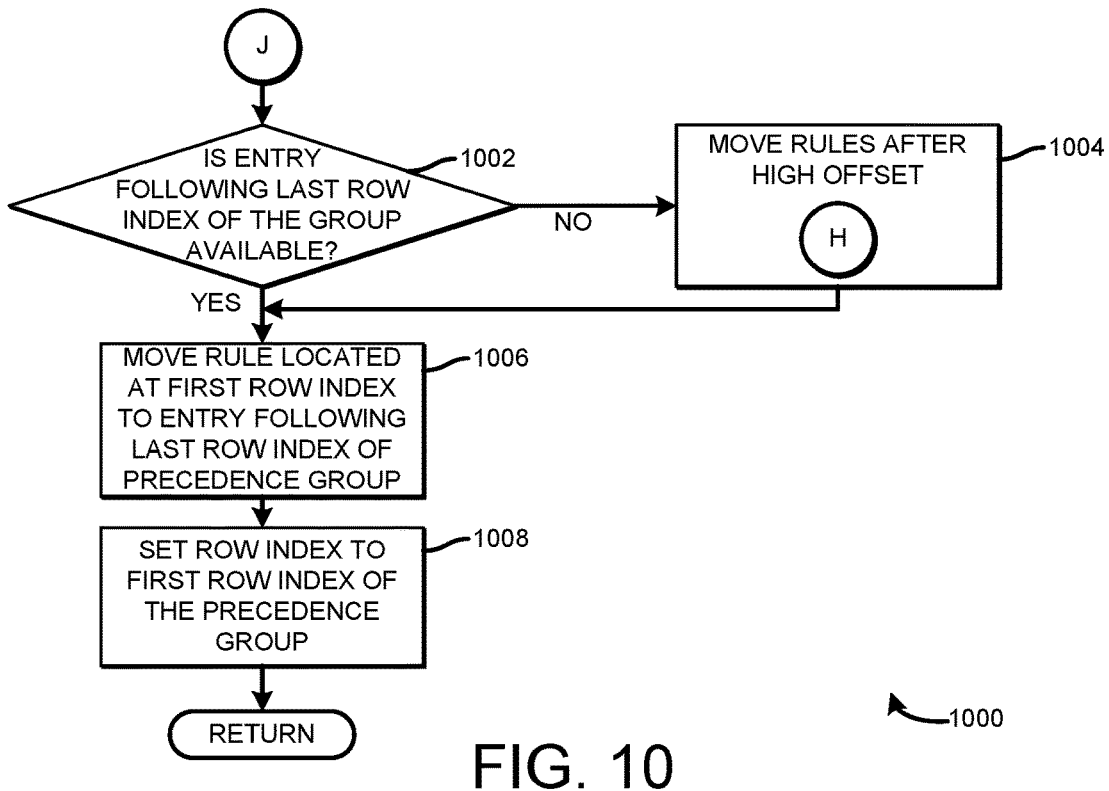
FIG. 10 is a simplified flow diagram of a method for moving a precedence group after determined offsets in the ACL table on the network device of FIG. 2.

Referring now to FIG. 10, the network device 102, in operation, may perform a method 1000 for moving a group of rules associated with a given precedence value. As shown, the method 1000 begins in block 1002, in which the network device 102 determines whether the entry following the last row index associated with the precedence group is available. If not, then in block 1004, the network device 102 moves the rules after the high offset. The method 1000 then proceeds to block 1006.

Returning to block 1002, if the entry following the last row index of the precedence group is available, then in block 1006, the network device 102 moves the rule from the first row index of the precedence group to the entry following the last row index of the precedence group. In block 1008, the network device 102 sets the row index of the new rule to an entry located at that first row index.

Figure 11:
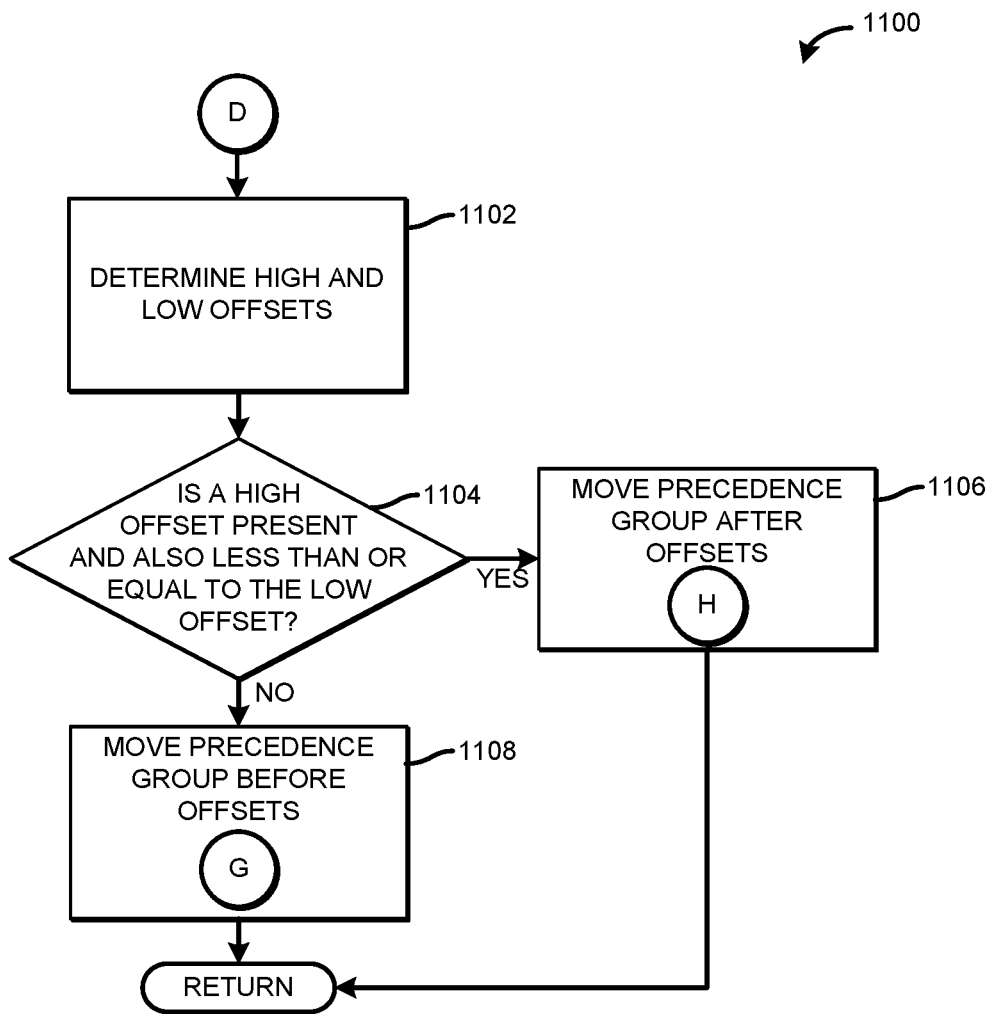
FIG. 11 is a simplified flow diagram of a method for moving rules to newly determined row indices in the ACL table on the network device of FIG. 2.

Referring now to FIG. 11, the network device 102, in operation, may perform a method 1100 for moving rules to newly determined row indices in the ACL 104. As shown, the method 1100 begins in block 1102, where the network device 102 determines high and low offsets associated with the set row index. As stated, the low offset corresponds to an offset between the set row index and first available entry down in the ACL 104. And the high offset corresponds to the offset between the set row index and first available entry up in the ACL 104.

In block 1104, the network device 102 determines whether the high offset is present and if so, whether the high offset value is less than or equal to the value of the low offset. If so, then in block 1106, the network device 102 moves the rules associated with the precedence group after the identified offsets. This approach is described further relative to FIG. 13. If not, then in block 1108, the network device 102 moves the rules associated with the precedence group before the identified offsets. This approach is described further relative to FIG. 12.

Figure 12:
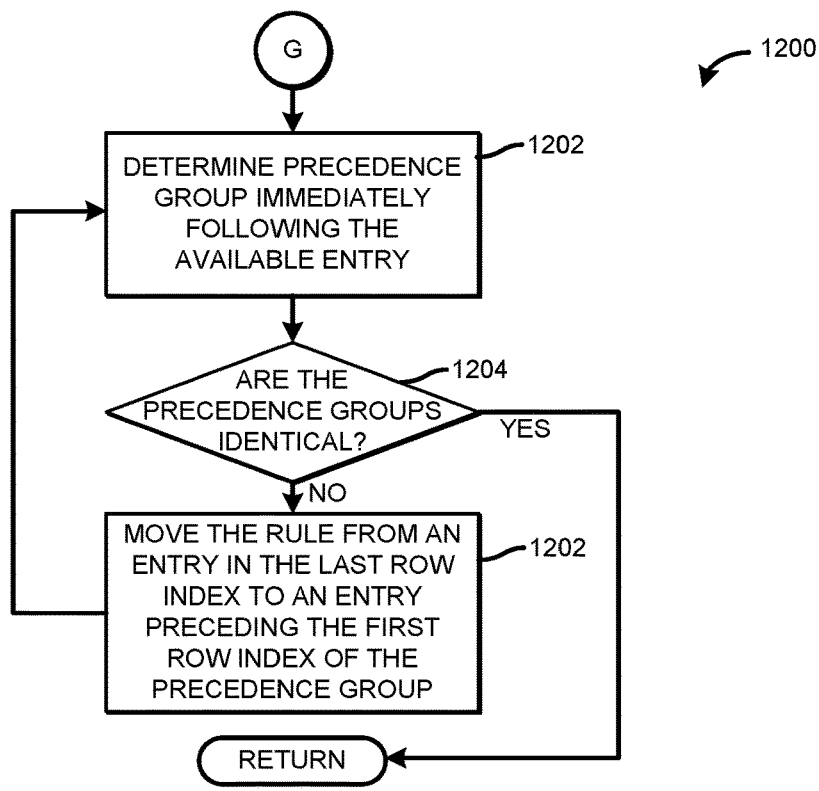
FIG. 12 is a simplified flow diagram of moving rules to newly determined row indices in the ACL table on the network device of FIG. 2.

Referring now to FIG. 12, the network device 102, in operation, performs a method 1200 for a rule associated with a given precedence group. As shown, the method 1200 begins in block 1202, in which the network device 102 determines the precedence group immediately following the available entry. In block 1204, the network device 102 determines whether the precedence group associated with the rule being added and the rule of the precedence group immediately following the available entry are identical. If so, then the network device 102 returns to method 1100. If not, then in block 1202, the network device 102 moves the rule from an entry in the last row index to an entry preceding the first row index of the precedence group. The method 1200 returns to block 1202 and continues until the network device 102 reaches a precedence group associated with the rule being added (e.g., YES on block 1204).

Figure 13:
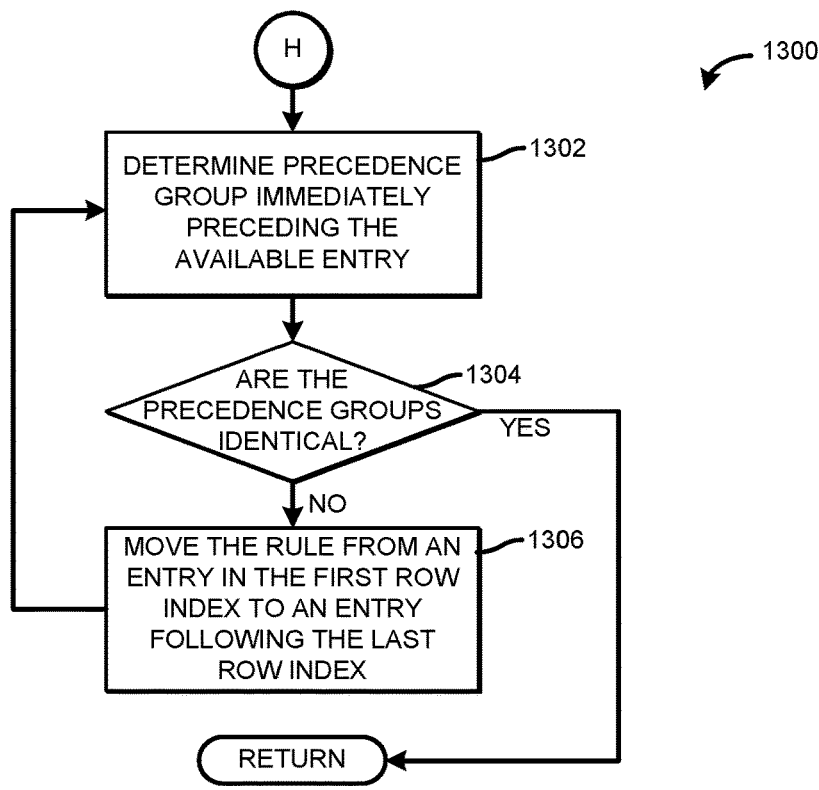
FIG. 13 is a simplified flow diagram of moving rules to newly determined row indices in the ACL table on the network device of FIG. 2.

Referring now to FIG. 13, the network device 102, in operation, performs a method 1300 for moving a rule associated with a given precedence value. As shown, the method 1300 begins in block 1302, in which the network device 102 determines the precedence group immediately preceding the available entry. Once determined, in block 1304, the network device 102 determines whether the precedence group associated with the rule being added and the rule of the precedence group immediately preceding the available entry are identical. If so, then the network device 102 returns to method 1100. If not, then in block 1306, the network device moves the rule from an entry in the first row index to the entry following the last row index of the precedence group. The method 1300 returns to block 1302 and continues until the network device reaches a precedence group associated with the rule being added (e.g., YES on block 1304).

Figure 14:
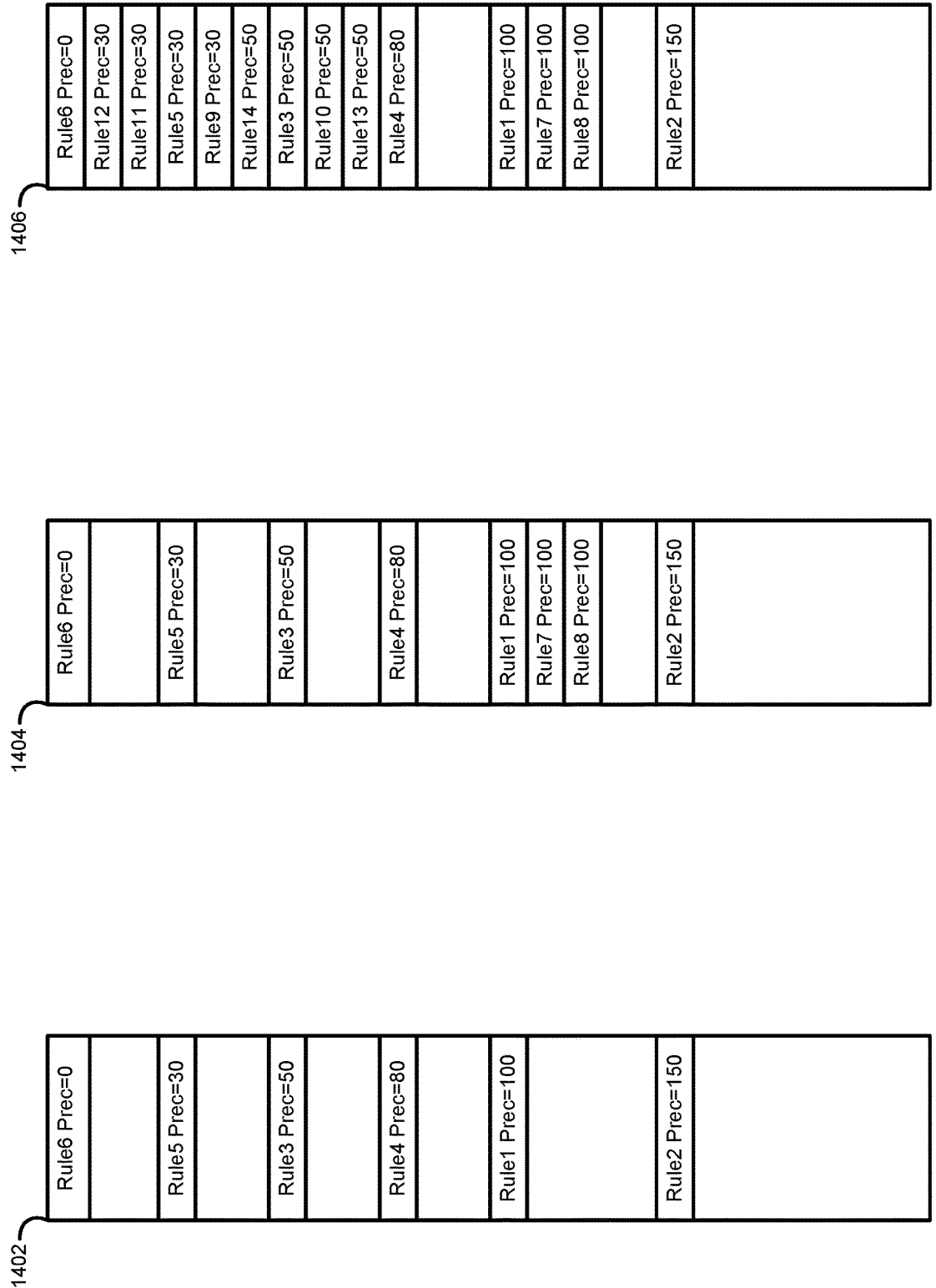
FIG. 14 is a simplified block diagram of at least one embodiment of an example ACL table as rule entries are added thereto.

Referring now to FIG. 14, an example ACL 104 is shown in different states. In state 1402, the ACL 104 includes six rules (Rule1 to Rule6) of varying precedence. Illustratively, the rules are ordered by precedence group value, with Rule6, having a precedence group value of 0, being at the beginning of the ACL 104. When the network device 102 first inserts a given rule to the ACL 104, such as Rule1 having a precedence group value of 100, the rule is inserted in an entry located at an index substantially in the middle of the ACL 104. A subsequent rule is then inserted relative to precedence group values of rules stored in the ACL 104. For example, Rule2, which has a precedence group value of 150, is added substantially in between Rule1 and the last row index of the ACL 104. As another example, Rule3, with a precedence group value of 50, is stored in an entry located substantially in the middle of Rule 1 and the top row index of the ACL 104. Generally, rules will be added relative to the existing precedence groups in the ACL 104. Rules having a precedence group of 0 serve as an exception and are to be inserted at the beginning of the ACL 104 (or towards the beginning of the ACL 104, in cases where another rule is occupying the top row index of the ACL 104).

State 1404 depicts a scenario in which multiple rules of an existing precedence group are added. Illustratively, Rule7 and Rule8, each having a precedence group value 100, are added to the table. As shown, the Rule7 is added immediately adjacent to Rule1 of precedence group value 100. Further, Rule8 is added immediately adjacent to Rule7.

Figure 15:
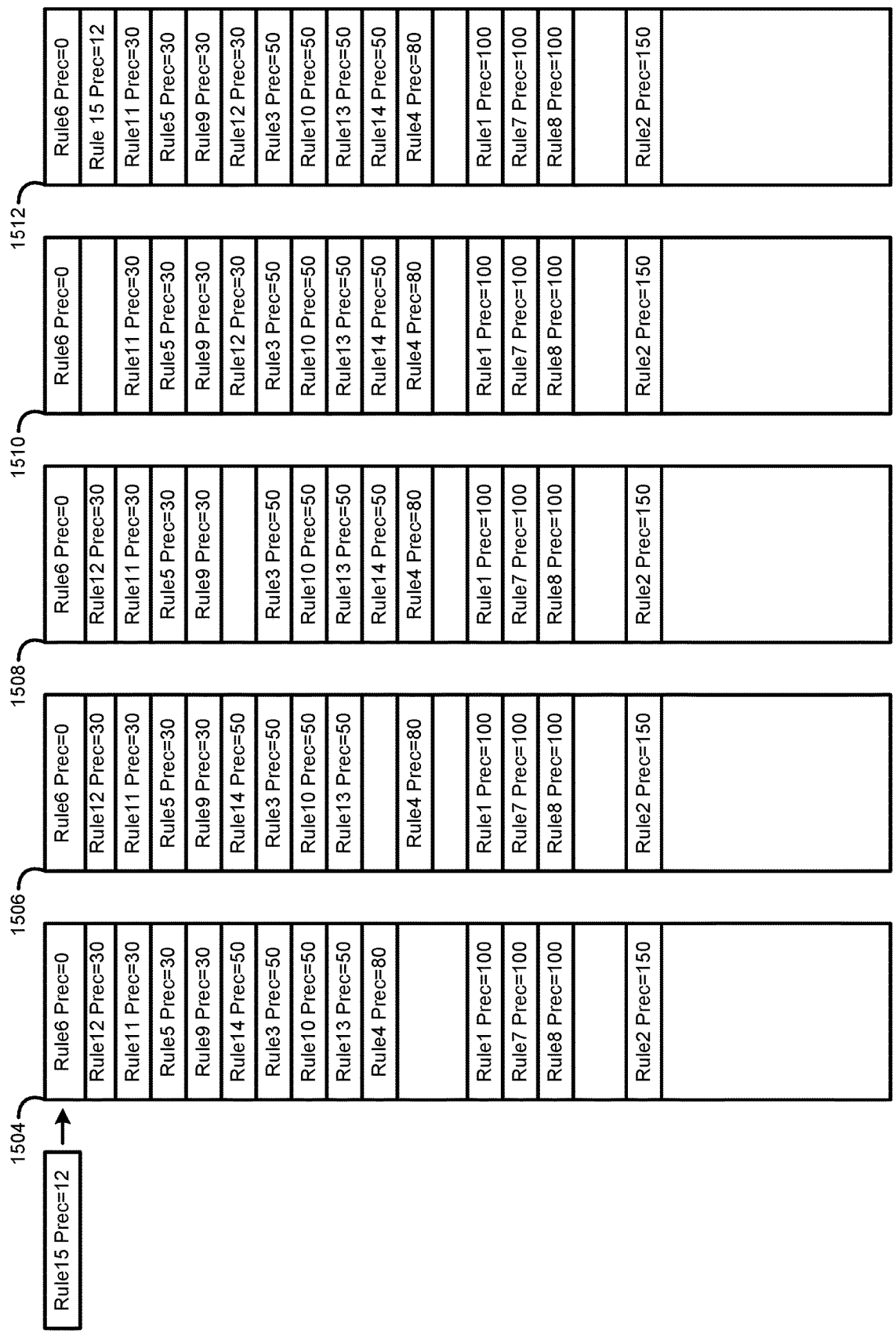
FIG. 15 is a simplified block diagram of at least one embodiment of adding a rule entry to an example ACL table of the network device of FIG. 2.

State 1406 depicts a scenario in which multiple rules of varying precedence group values are added to the ACL 104. As rules are added, the rules are grouped according to precedence group value. Advantageously, this approach minimizes the amount of register accesses required within the TCAM for rule movement. Generally, no rule movement is required until there is no space between two precedence groups. For example, referring now to FIG. 15, an example of moving rules of precedence groups to create an available entry for a rule to be inserted is shown.

In this example, a Rule15 having a precedence group value of 12 is to be added to the ACL 104 by the network device 102. As shown in state 1504, Rule15 is to be inserted between Rule6 (of precedence group value 0) and Rule12 (of precedence group value 30). However, illustratively, Rule6 and Rule 12 are immediately adjacent to one another. As a result, the network device 102 must move rules down to create availability for Rule 15. In this case, the next available entry is located below Rule4, which has a precedence group value of 80. Further, a number of rules having a precedence group value of 30 and 50 are positioned between Rule12 and Rule4.

State 1506 depicts the network device 102 moving Rule4 by one position. State 1508 depicts the network device 102 moving Rule14 of precedence group value 50 to the free entry previously occupied by Rule4. State 1510 depicts the network device 102 moving Rule12 of precedence group value 30 to the newly free entry previously occupied by Rule14. Doing so creates an available entry between Rule6 (of precedence group 0) and Rule12 (of precedence group 30). In state 1512, the Rule15 is inserted between Rule6 and Rule12. Of note, only one rule per precedence group value of 30, 50, and 80 were moved. That is, the rules having a precedence group value of 100 and 150 did not move to a new position, thus preserving rule movement operations by the network device 102 for those rules.

EXAMPLES

Illustrative examples of the technologies disclosed herein are provided below. An embodiment of the technologies may include any one or more, and any combination of, the examples described below.

Example 1 includes a network device comprising a content addressable memory including an access control list (ACL); and a switch logic to receive a request to store a first rule to the ACL, wherein the first rule is associated with a first precedence group of a plurality of precedence groups and wherein each precedence group is indicative of a placement priority of a given rule in the ACL; determine, as a function of the first precedence group, a placement for the first rule in the ACL; and store the first rule according to the determined placement in the ACL.

Example 2 includes the subject matter of Example 1, and wherein to determine the placement comprises to determine the placement that preserves, based on the first precedence group, the priority of the first rule relative to other rules stored in the ACL and wherein to store the first rule according to the determined placement in the ACL comprises to store the first rule without causing disruption to performance of the network device.

Example 3 includes the subject matter of any of Examples 1 and 2, and wherein the ACL is initially empty and wherein to store the first rule according to the determined placement in the ACL comprises to store the first rule in an entry of the ACL that is located at a middle row index of the ACL.

Example 4 includes the subject matter of any of Examples 1-3, and wherein the ACL is not initially empty prior to the storage of the first rule in the ACL and wherein to determine the placement of the first rule comprises to determine a second precedence group of a higher priority than the first precedence group and a third precedence group of a higher priority than the second precedence group.

Example 5 includes the subject matter of any of Examples 1-4, and wherein to store the first rule comprises to store the first rule in a row index located substantially in the middle of a rule located in a last row index of the second precedence group and a rule located in a first row index of the third precedence group.

Example 6 includes the subject matter of any of Examples 1-5, and wherein the switch logic is further to move a placement of rules associated with the second precedence group and a placement of rules associated with the third precedence group and wherein to store the first rule in the ACL comprises to store the first rule in an entry located in a row index substantially in the middle of the rules associated with the second precedence group and the rules associated with the third precedence group.

Example 7 includes the subject matter of any of Examples 1-6, and wherein a second rule associated with the first precedence group is stored in the ACL.

Example 8 includes the subject matter of any of Examples 1-7, and wherein to store the second rule in the ACL comprises to store the second rule in an entry located in a row index adjacent to an entry storing the first rule in the ACL.

Example 9 includes the subject matter of any of Examples 1-8, and wherein the ACL is initially empty and the first precedence group corresponds to a precedence group having low priority.

Example 10 includes the subject matter of any of Examples 1-9, and wherein to store the first rule comprises to store the first rule in an entry located in a top row index in a lowest precedence row of the ACL.

Example 11 includes the subject matter of any of Examples 1-10, and wherein the content addressable memory is a ternary content addressable memory (TCAM).

Example 12 includes the subject matter of any of Examples 1-11, and wherein to store the first rule according to the determined placement in the ACL comprises to move a rule located in an entry in a last row index of a given precedence group having a lesser precedence group value than that of the first rule to a first row index of the given precedence group; and store the first rule in an entry corresponding to the last row index of the given precedence group.

Example 13 includes one or more machine-readable storage media comprising a plurality of instructions, which, when executed, causes a network device to receive a request to store a first rule to an access control list (ACL), wherein the first rule is associated with a first precedence group of a plurality of precedence groups and wherein each precedence group is indicative of a placement priority of a given rule in the ACL; determine, as a function of the first precedence group, a placement for the first rule in the ACL; and store the first rule according to the determined placement in the ACL.

Example 14 includes the subject matter of Example 13, and wherein to determine the placement comprises to determine the placement that preserves, based on the first precedence group, the priority of the first rule relative to other rules stored in the ACL and wherein to store the first rule according to the determined placement in the ACL comprises to store the first rule without causing disruption to performance of the network device.

Example 15 includes the subject matter of any of Examples 13 and 14, and wherein the ACL is initially empty and wherein to store the first rule according to the determined placement in the ACL comprises to store the first rule in an entry of the ACL that is located at a middle row index of the ACL.

Example 16 includes the subject matter of any of Examples 13-15, and wherein the ACL is not initially empty prior to the storage of the first rule in the ACL and wherein to determine the placement of the first rule comprises to determine a second precedence group of a higher priority than the first precedence group and a third precedence group of a higher priority than the second precedence group.

Example 17 includes the subject matter of any of Examples 13-16, and wherein to store the first rule comprises to store the first rule in a row index located substantially in the middle of a rule located in a last row index of the second precedence group and a rule located in a first row index of the third precedence group.

Example 18 includes the subject matter of any of Examples 13-17, and wherein the plurality of instructions further causes the network device to move a placement of rules associated with the second precedence group and a placement of rules associated with the third precedence group and wherein to store the first rule in the ACL comprises to store the first rule in an entry located in a row index substantially in the middle of the rules associated with the second precedence group and the rules associated with the third precedence group.

Example 19 includes the subject matter of any of Examples 13-18, and wherein a second rule associated with the first precedence group is stored in the ACL.

Example 20 includes the subject matter of any of Examples 13-19, and wherein to store the second rule in the ACL comprises to store the second rule in an entry located in a row index adjacent to an entry storing the first rule in the ACL.

Example 21 includes the subject matter of any of Examples 13-20, and wherein the ACL is initially empty and the first precedence group corresponds to a precedence group having low priority.

Example 22 includes a method comprising receiving, by a network device, a request to store a first rule to an access control list (ACL), wherein the first rule is associated with a first precedence group of a plurality of precedence groups and wherein each precedence group is indicative of a placement priority of a given rule in the ACL; determine, by the network device and as a function of the first precedence group, a placement for the first rule in the ACL; and store, by the network device, the first rule according to the determined placement in the ACL.

Example 23 includes the subject matter of Example 22, and wherein determining the placement comprises determining the placement that preserves, based on the first precedence group, the priority of the first rule relative to other rules stored in the ACL and wherein storing the first rule according to the determined placement in the ACL comprises to store the first rule without causing disruption to performance of the network device.

Example 24 includes a network device comprising circuitry for receiving a request to store a first rule to an access control list (ACL), wherein the first rule is associated with a first precedence group of a plurality of precedence groups and wherein each precedence group is indicative of a placement priority of a given rule in the ACL; means for determining, as a function of the first precedence group, a placement for the first rule in the ACL; and circuitry for storing the first rule according to the determined placement in the ACL.

Example 25 includes the subject matter of Example 24, and wherein the means for determining the placement comprises means for determining the placement that preserves, based on the first precedence group, the priority of the first rule relative to other rules stored in the ACL.

The invention claimed is:
1. A network device comprising:
a content addressable memory to include an access control list (ACL); and
a circuitry to:
receive a request to include a first rule in the ACL;
assign the first rule to a first precedence group of a plurality of precedence groups and wherein at least one precedence group is indicative of a placement priority of a given rule in the ACL, wherein the at least one precedence group includes one or more row indices for rule ordering in the ACL, and wherein at least one row index of the one or more row indices corresponds to a location in the content addressable memory;
determine, based on the first precedence group, a placement for the first rule in the ACL within one of the one or more row indices;
include the first rule in the ACL according to the determined placement; and
store the first rule in the content addressable memory based on the determined placement.

2. The network device of claim 1, wherein to determine the placement comprises to determine the placement that preserves, based on the first precedence group, the priority of the first rule relative to other rules ordered in the ACL and wherein to include the first rule according to the determined placement in the ACL comprises to include the first rule without causing disruption to performance of the network device.

3. The network device of claim 1, wherein the ACL is initially empty and wherein to include the first rule according to the determined placement in the ACL comprises to include the first rule in an entry of the ACL that is located at a row index in a middle section of the ACL.

4. The network device of claim 1, wherein the ACL is not initially empty prior to the storage of the first rule in the ACL and wherein to determine the placement of the first rule comprises to determine a second precedence group of a higher priority than the first precedence group and a third precedence group of a higher priority than the second precedence group.

5. The network device of claim 4, wherein to include the first rule comprises to associate the first rule which a row index located between a rule located in a last row index of the second precedence group and a rule located in a first row index of the third precedence group.

6. The network device of claim 4, wherein the circuitry is further to move a placement of rules associated with the second precedence group and a placement of rules associated with the third precedence group and wherein to include the first rule in the ACL comprises to include the first rule in an entry located in a row index between the rules associated with the second precedence group and the rules associated with the third precedence group.

7. The network device of claim 1, wherein a second rule associated with the first precedence group is included in the ACL.

8. The network device of claim 7, wherein to include the second rule in the ACL comprises to include the second rule in an entry located in a row index adjacent to an entry storing the first rule in the ACL.

9. The network device of claim 1, wherein the ACL is initially empty and the first precedence group corresponds to a precedence group having low priority.

10. The network device of claim 9, wherein to include the first rule comprises to include the first rule in an entry located in a top row index in a lowest precedence row of the ACL.

11. The network device of claim 1, wherein the content addressable memory comprises a ternary content addressable memory (TCAM).

12. The network device of claim 1, wherein to include the first rule according to the determined placement in the ACL comprises to:
  move a rule located in an entry in a last row index of a given precedence group having a lesser precedence group value than that of the first rule to a first row index of the given precedence group; and
  include the first rule in an entry corresponding to the last row index of the given precedence group.

13. One or more non-transitory machine-readable storage media comprising a plurality of instructions, which, when executed, causes a network device to:
  receive a request to include a first rule in the ACL;
  assign the first rule to a first precedence group of a plurality of precedence groups and wherein at least one precedence group is indicative of a placement priority of a given rule in the ACL, wherein the at least one precedence group includes one or more row indices for rule ordering in the ACL, and wherein at least one row index of the one or more row indices corresponds to a location in the content addressable memory;
  determine, based on the first precedence group, a placement for the first rule in the ACL within one of the one or more row indices;
  include the first rule in the ACL according to the determined placement; and
  store the first rule in the content addressable memory based on the determined placement.

14. The one or more non-transitory machine-readable media of claim 13, wherein to determine the placement comprises to determine the placement that preserves, based on the first precedence group, the priority of the first rule relative to other rules ordered in the ACL and wherein include store the first rule according to the determined placement in the ACL comprises to include the first rule without causing disruption to performance of the network device.

15. The one or more non-transitory machine-readable media of claim 13, wherein the ACL is initially empty and wherein to include the first rule according to the determined placement in the ACL comprises to include the first rule in an entry of the ACL that is located at a row index in a middle section of the ACL.

16. The one or more non-transitory machine-readable media of claim 13, wherein the ACL is not initially empty prior to the storage of the first rule in the ACL and wherein to determine the placement of the first rule comprises to determine a second precedence group of a higher priority than the first precedence group and a third precedence group of a higher priority than the second precedence group.

17. The one or more non-transitory machine-readable media of claim 16, wherein to include the first rule comprises to associate the first rule with a row index located between a rule located in a last row index of the second precedence group and a rule located in a first row index of the third precedence group.

18. The one or more non-transitory machine-readable media of claim 16, wherein the plurality of instructions further causes the network device to move a placement of rules associated with the second precedence group and a placement of rules associated with the third precedence group and wherein to include the first rule in the ACL comprises to include the first rule in an entry located in a row index between the rules associated with the second precedence group and the rules associated with the third precedence group.

19. The one or more non-transitory machine-readable media of claim 13, wherein a second rule associated with the first precedence group is included in the ACL.

20. The one or more non-transitory machine-readable media of claim 19, wherein to store the second rule in the ACL comprises to store the second rule in an entry located in a row index adjacent to an entry storing the first rule in the ACL.

21. The one or more non-transitory machine-readable media of claim 13, wherein the ACL is initially empty and the first precedence group corresponds to a precedence group having low priority.

22. A method comprising:
  receiving a request to include a first rule in the ACL;
  assigning the first rule to a first precedence group of a plurality of precedence groups and wherein at least one precedence group is indicative of a placement priority of a given rule in the ACL, wherein the at least one precedence group includes one or more row indices for rule ordering in the ACL, and wherein at least one row index of the one or more row indices corresponds to a location in the content addressable memory;

determining, based on the first precedence group, a placement for the first rule in the ACL within one of the one or more row indices;

include, by the network device, the first rule in the ACL according to the determined placement; and storing the first rule in the content addressable memory based on the determined placement.

23. The method of claim 22, wherein determining the placement comprises determining the placement that preserves, based on the first precedence group, the priority of the first rule relative to other rules ordered in the ACL and wherein including the first rule according to the determined placement in the ACL comprises including the first rule without causing disruption to performance of the network device.

24. A network device comprising:

circuitry for receiving a request to include a first rule in the ACL;

means for assigning the first rule to a first precedence group of a plurality of precedence groups and wherein at least one precedence group is indicative of a placement priority of a given rule in the ACL, wherein the at least one precedence group includes one or more row indices for rule ordering in the ACL, and wherein at least one row index of the one or more row indices corresponds to a location in the content addressable memory;

means for determining, based on the first precedence group, a placement for the first rule in the ACL within one of the one or more row indices;

circuitry for including the first rule in the ACL according to the determined placement; and circuitry for storing the first rule in the content addressable memory based on the determined placement.

25. The network device of claim 24, wherein the means for determining the placement comprises means for determining the placement that preserves, based on the first precedence group, the priority of the first rule relative to other rules ordered in the ACL.

* * * * *

UNITED STATES PATENT AND TRADEMARK OFFICE
CERTIFICATE OF CORRECTION

PATENT NO. : 11,483,313 B2  
APPLICATION NO. : 16/021816  
DATED : October 25, 2022  
INVENTOR(S) : Real Valiquette et al.

Page 1 of 1

It is certified that error appears in the above-identified patent and that said Letters Patent is hereby corrected as shown below:

In the Claims

Column 18 Lines 54-55 Claim 20 change:
"wherein to store the second rule in the ACL comprises to store the second rule"

To:
where to include the second rule in the ACL comprises to include the second rule Signed and Sealed this
Twenty-fourth Day of January, 2023

Katherine Kelly Vidal
*Director of the United States Patent and Trademark Office*